T. A. Frakes,
Bee Hive.
No. 103,166.  Patented May 17, 1890.
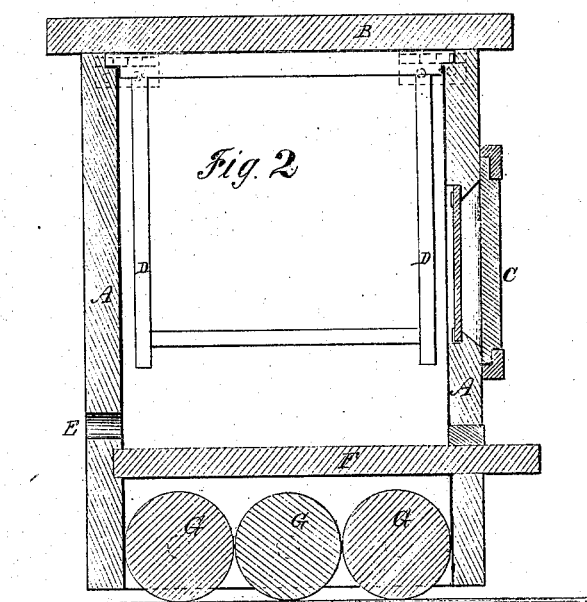
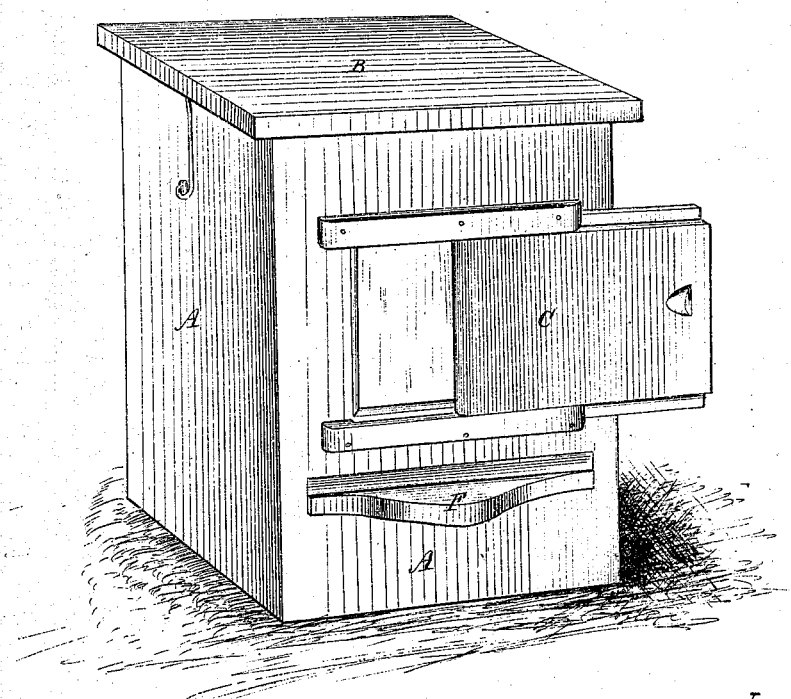
Witnesses  Inventor

United States Patent Office.

THOMAS A. FRAKES, OF MIDDLETOWN, ILLINOIS.

Letters Patent No. 103,166, dated May 17, 1870.

IMPROVEMENT IN BEE-HIVES.

The Schedule referred to in these Letters Patent and making part of the same.

To all whom it may concern:

Be it known that I, THOMAS A. FRAKES, of Middletown, in the county of Logan and State of Illinois, have invented a new and improved Bee-Hive; and I do hereby declare that the following is a full, clear, and exact description thereof, reference being had to the accompanying drawings and to the letters of reference marked thereon.

Drawings.

Figure 1 is a perspective view of my improved bee-hive, and

Figure 2 is a central vertical elevation, taken on a line from front to rear of fig. 1.

Similar letters of reference denote like parts in each of the figures.

This invention relates to that class of devices known as bee-hives; and

It consists in combining friction-rollers with the lower end of the bee-hive, in such a manner as to support the hive above the surface upon which it is placed, and to cause said rollers to revolve when the hive is pushed about.

To enable those skilled in the art to which my invention relates to make and use the same, I will proceed to describe its construction and operation.

In the annexed drawings forming a part of this specification—

A A represent the walls of the hive, and

B, the cover.

C represents a slide, placed over a glass in one side of the hive, for the purpose of observing the working of the bees, as also to ascertain the presence of bugs, insects, and the like, within the hive proper.

D represents a form of comb-frame hung within the hive, as shown in fig. 2.

The bees gain admission to the hive through the apertures E, arranged just above the sliding shelf F.

G G represent rollers, having a horizontal axis below the slide F, in such a manner that they will project below the bottom of the hive, thus raising it free from whatever it rests upon, and causing it to be supported upon the rollers.

The peripheries of these rollers are nearly or quite contiguous to each other.

Bugs, insects, &c., will go in under the hive, and will thus be unable to get into it, being shut out by means of slide F.

Flies, moths, bugs, and insects are destroyed by pushing the hive back and forth a few times two or three times a week, which should be done early in the morning.

If any insect or foreign matter whatever should get upon the upper side of the slide, it can be pulled out and cleaned.

By this process the hive can be cleaned, and so kept without disturbing the bees.

The hive should stand upon some smooth, solid surface, as a plank, table, or the like.

I do not confine myself to any particular number of rollers; but, having thus described my invention,

What I claim, and desire to secure by Letters Patent of the United States, is—

The friction-rollers G G, arranged below the shelf F, and supporting the body of the hive clear from the surface upon which said rollers rest, substantially as shown and described and for the purpose specified.

In testimony whereof I have signed my name hereto in the presence of two subscribing witnesses.

THOMAS A. FRAKES.

Witnesses:
WILLIAM TOOMEY,
A. W. PRITCHETT.